United States Patent [19]

Yamaguchi et al.

[11] Patent Number: 4,708,302

[45] Date of Patent: Nov. 24, 1987

[54] MODE SWITCHING OVER GEAR MECHANISM FOR REEL

[75] Inventors: Katsumi Yamaguchi; Syouichiro Yokoi; Takao Kanai; Kikuo Yoshikawa, all of Tokyo, Japan

[73] Assignee: Clarion Co., Ltd., Tokyo, Japan

[21] Appl. No.: 630

[22] Filed: Jan. 6, 1987

[30] Foreign Application Priority Data

Jan. 14, 1986 [JP] Japan .................................. 61-6053
Jan. 29, 1986 [JP] Japan .................................. 61-15927

[51] Int. Cl.⁴ ...................... G11B 15/32; G11B 19/02; G11B 15/00
[52] U.S. Cl. .................................. 242/204; 360/69; 360/96.3
[58] Field of Search ................... 242/204, 200, 201; 360/69, 73, 74.1, 93, 96.1, 96.3

[56] References Cited

U.S. PATENT DOCUMENTS

| 4,420,783 | 12/1983 | Suezawa et al. | 360/69 X |
| 4,452,409 | 6/1984 | Takai | 360/74.1 X |
| 4,491,887 | 1/1985 | Sato | 360/69 X |
| 4,547,823 | 10/1985 | Ri et al. | 360/93 X |
| 4,581,666 | 4/1986 | Itoh | 360/73 X |

*Primary Examiner*—Stuart S. Levy
*Assistant Examiner*—Steven duBois
*Attorney, Agent, or Firm*—Flynn, Thiel, Boutell & Tanis

[57] ABSTRACT

A mode switching over gear mechanism for reel according to this invention is characterized in that a reel brake is disposed at the outside of the fast forward gear and the rewinding gear, respectively; a preload brake is disposed at the inside of the fast forward gear and the rewinding gear, respectively; and the control of the preload brake is effected by the same member as the control of the take-up gear effecting the mode switching over at the play, which member is different from the member for the control of the reel brake.

Owing to this construction, since the preload brake is released at the same time as the mode switching over by the engagement of the take-up gear, no infructuous load is applied thereto.

2 Claims, 3 Drawing Figures

MODE SWITCHING OVER GEAR MECHANISM FOR REEL

FIELD OF THE INVENTION

This invention relates to a mode switching over gear mechanism for reel used in a digital audio type tape recorder having a rotating head.

BACKGROUND OF THE INVENTION

Recently techniques for recording digital signals obtained by transforming audio signals, which are analogue signals, on a tape are being developed with the development of the digital audio techniques. Since an extremely wide frequency band exclusively used therefor is necessary for transforming analogue signals into digital signals, it is required that the contact area per unit time in a magnetic head for recording signals on a tape or reproducing them is large. For this purpose, since it is an indispensable condition to adopt a rotating head system instead of the conventional fixed head system, heretofore various kinds of tape recorders provided with a rotating head based on such a condition have been proposed.

In such a tape recorder tape loading, by which the tape is drawn out and wound round a rotating head, is effected after cassette loading. At this time the reels rotate in accompany with extraction of the tape. In this case, a certain tension should be applied to the reels. Unless otherwise, the tape is drawn out too much and therefore there is a fear that looseness, etc. is produced in the tape.

Heretofore there was known a band brake applying backtension to the supply reel at the play in order to prevent it. However its principal object is tape tension servo and not prevention of the looseness in the tape. Consequently a construction, by which a preload brake for tape loading and play is incorporated in the same mechanism, has been proposed and realized in practice.

However, in the case where a preload brake is used, there are a number of problems that at the play, in addition to the band brake, the load due to the preload brake is applied and thus it is necessary to increase the driving force of the reel, etc.

OBJECTS OF THE INVENTION

This object has been done in order to remove these inconveniences of the prior art techniques, as described previously, and the object of this invention is to provide a mode switching over gear mechanism for reel used in a digital audio type tape recorder for a magnetic recording/reproduction device, etc., for which at the play the preload brake is released and it is not necessary to increase the driving force of the reel by applying infructuous load.

SUMMARY OF THE INVENTION

In order to achieve this object, a mode switching over gear mechanism for reel according to this invention comprises a winding reel for winding a tape at the play mode in the tape recorder; a supply reel for sending out the tape at the play mode; a reel driving gear rotated by a reel motor; a center gear disposed between the winding reel and the supply reel and engaged with the reel driving gear; a take-up gear disposed between the center gear and the winding reel and engaged with the center gear and the rewinding reel at the play mode so as to link them; a fast forward gear engaged always with the winding reel; a rewinding gear engaged always with the supply reel; a linking arm for fast forward/rewinding, whose one end is mounted on the shaft of the center gear, having friction with respect to the center gear; a linking gear for fast forward/rewinding mounted on the other end of the linking arm, engaged selectively with the fast forward gear or the rewinding gear, depending on the rotational direction of the linking arm; two reel brakes disposed at the outside of the fast forward gear and the rewinding gear, respectively, and thrusted thereagainst at the play mode; two preload brakes disposed at the inside of the fast forward gear and the rewinding gear, respectively, and thrusted thereaginst at the tape loading mode and at the fast forward/rewinding mode; a first control member for controlling thrust and separation of the reel brakes with respect to the fast forward gear and the rewinding gear; and a second control member for controlling engagement and disengagement of said take-up gear with respect to the fast forward gear and the rewinding gear and thrust and separation of the preload brakes with respect to the fast forward gear and the rewinding gear.

In an advantageous realization form of this invention the reel driving gear is disposed coaxially to and independently of the supply reel thereunder.

DETAILED DESCRIPTION

Figure 1:
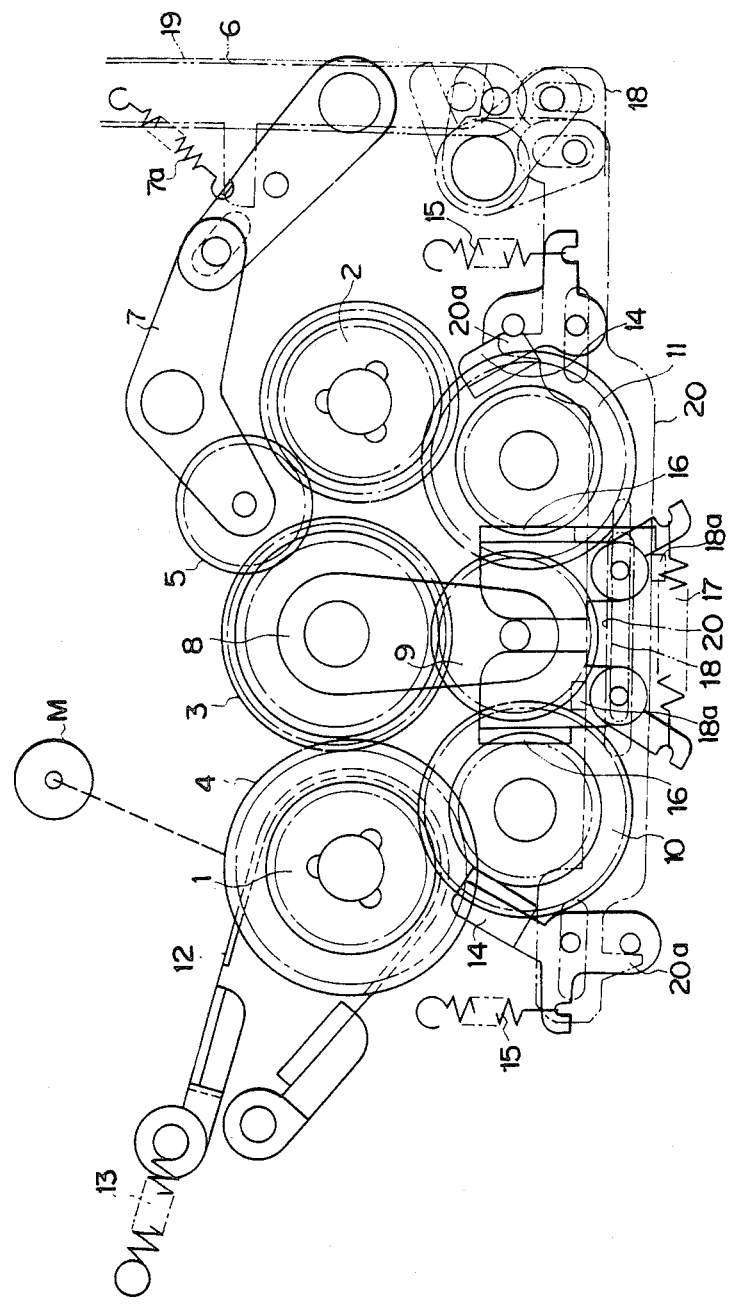
FIG. 1 is a plan view illustrating a mode switching over gear mechanism for reel in an embodiment of this invention at the play.

An embodiment of mode switching over gear mechanisms for reel described above according to this invention will be explained below more in detail, referring to the drawings.

Construction

Figure 2:
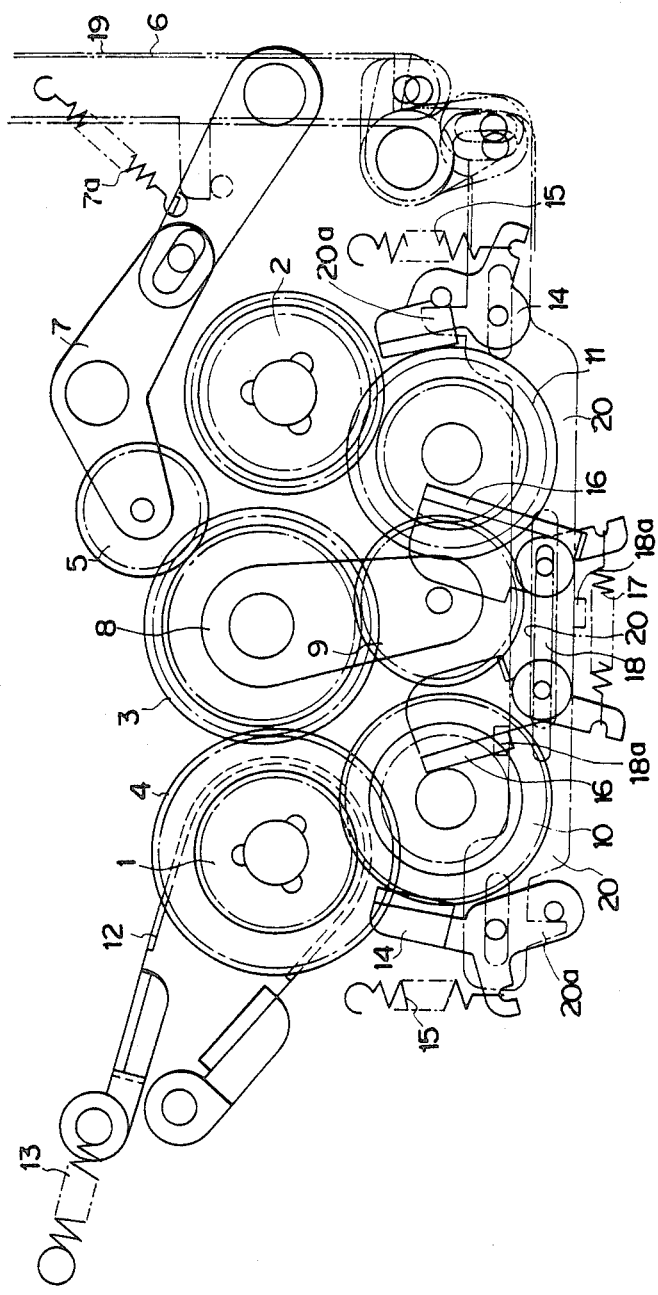
FIG. 2 is a plan view illustrating the same mode switching over gear mechanism for reel at the fast forward.
Figure 3:
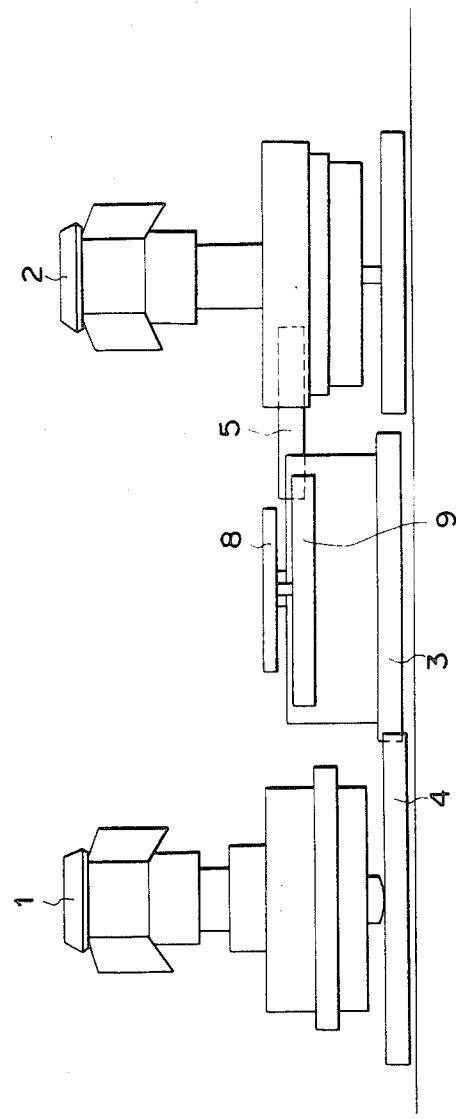
FIG. 3 is a front view illustrating the same mode switching over gear mechanism for reel.

In FIGS. 1 and 2 the reference numerals 1 and 2 represent a supply reel and a winding reel, respectively, each of which has a gear. At the middle point between the reels 1 and 2 is mounted a center gear 3. The center gear 3 is engaged always with a reel driving gear 4 mounted coaxially to and independently of the supply reel 1 thereunder, as indicated in FIG. 3. The reel driving gear 4 is linked with a inversion type reel motor M through a belt and pulleys. Between the winding reel 2 and the center gear 3 is disposed a take-up gear 5. This take-up gear 5 is controlled by a first control plate 6 linked with a loading motor through an arm 7 and links the winding reel 2 and the center gear 3 at the play by the fact that the arm 7, whose regulation is liberated by displacement of the first control plate 6, as indicated in FIG. 1.

One end of a fast forward/rewinding linking arm 8 is mounted on the center gear 3 with friction and the center gear 3 is engaged always with a fast forward/rewinding linking gear 9 mounted on the other end of the fast forward/rewinding linking arm 8. This fast forward/rewinding linking gear 9 is engaged with either one of a rewinding gear 10 and a fast forward gear 11 engaged with the reels 1 and 2, respectively, depending on the rotation of the fast forward/rewinding linking arm 8 in the rotational direction of the center gear 3 and in this way the supply reel 1 or the winding reel 2 rotates with a high speed.

A band brake 12 exerting the backtension servo at the play is fixed on the supply reel 1 and energized by a spring 13 in the thrusting direction. This band brake 12 is kept in its separated position through a releasing member before the tape loading and in the course of the tape loading so that it exerts no additional load at the tape loading.

In the figure the reference numeral 14 represents a reel brake thrusted against the fast forward gear 11 and the rewinding gear 10 from the outside by an energized spring 15 and 16 represents a preload brake thrusted against the fast forward gear 11 and the rewinding gear 10 from the inside by an energized spring 17. Among of them the reel brake 14 gives slight friction to the fast forward gear 11 and the rewinding gear 10 at the moment of a switching over of the fast forward/rewinding operation and the play operation in order to prevent that the tape is loosened in accompany with the switching over operation. On the other hand, the preload brake 16 moderates the force for drawing out the tape at the loading and at the fast forward/rewinding, prevents the looseness in the tape due to excessive drawing out of the tape, and at the same time energizes the fast forward/rewinding linking gear 9 described above towards its center position. In the figure the reference numeral 18 represents a first brake release plate linked with the first control plate 6 described above, which releases the preload brake 16 by its thrusting portion 18a, when it moves to right. 19 is a second control plate superposed on the first control plate 6 and linked with a second brake releases plate 20 superposed on the first brake release plate 18. The second brake release plate 20 releases the reel brake 14 by means of its thrusting portion 20a, when it moves to right.

Operation

The operation of the mode switching over gear mechanism for reel according to this invention having the construction described above is as follows.

1. At the tape loading

At the tape loading, as soon as the cassette loading by insertion of a cassette has been terminated, the loading motor begins to rotate. In this way the left and the right loading block move forward. With this movement the tape is drawn out from the supply reel 1 or the rewinding reel 2. However, at this time, since the first brake release plate 18 is on the left side in the figure, the preload brake 16 gives a load to each of the reels 1 and 2 through the fast forward gear 11 and the rewinding gear 10 and alleviates the force drawing out the tape. Consequently there is no fear to have troubles produced by the fact that too much tape is drawn out. At the tape loading, since the second brake release plate 20 is on the right side in the figure, the reel brake 14 is not thrusted. Further, at the tape loading, the band brake 12 is separated from the supply reel 1 by a release member not shown in the figure.

2. At the play—FIG. 1.

At the play, starting from the state where the tape loading has been terminated, the loading motor is rotated and the pinch roller is thrusted against the capstan. At the same time, since the first control plate 6 is driven upward, being liberated from its regulation, the take-up gear 5 is engaged with the winding reel 2 and the center gear 3 by the energized spring 7a and thus links the two members. At this time, since the reel driving gear 4 is rotated counterclockwise by the reel motor, the winding reel 2 is rotated clockwise, i.e. in the winding direction, through the center gear 3 and the take-up gear 5 and thus the tape is moved.

At this time, since the first control plate 6 is on the upper side in the figure and the first brake release plate 18 is on the right side in the figure, the preload brake 16 is rotated to its center position and fixed there. In accompany with this movement, the fast forward/rewinding linking gear 9 is also maintained in its center position. Further the band brake 12 is thrusted against the supply reel 1 and exerts a backtension thereto.

3. At the fast forward and the rewinding—FIG. 2

At the fast forward and the rewinding the loading motor rotates in the reverse direction and the pinch roller is separated from the capstan. At this time, since the fast control plate 6 moves to the lower side in the figure, as indicated in FIG. 2, being liberated from its regulation, the take-up gear 5 is separated from the center gear 3 and the winding reel 2. Further, since in accompany with the displacement of the first control plate 6 the first brake release plate 18 moves to the left side, the preload brake 16 is thrusted against the fast forward gear 11 and the winding gear 10. Consequently the fast forward/rewinding linking gear 9 is also liberated from its positional regulation. On the other hand, since the second control brake 19 moves to the upper side in the figure and the second brake release plate 20 moves to the right side, the reel brake 14 is liberated by its thrusting portion 20a.

That is, at the fast forward the reel driving gear 4 rotates clockwise and the center gear 3 engaged therewith rotates counterclockwise. In this way, subsequently to the switching over operation described above, the fast forward/rewinding linking arm 8 rotates clockwise by the friction thereof with the center gear 3, the fast forward/rewinding linking gear 9 is engaged with the fast forward gear 11, the winding reel 2 rotates with a high speed, and thus the fast forward operation is effected (FIG. 2). In this case, since the preload brake 16 is thrusted, no looseness in the tape is produced by the switching over operation and the high speed rotation.

Further, at the rewinding the reel driving gear 4 rotates counterclockwise and the center gear 3 rotates clockwise. In this way the fast forward/rewinding linking gear 9 is engaged with the rewinding gear 10, the supply reel 1 rotates with a high speed, and the rewinding operation is effected.

As explained above, according to this embodiment, owing to the construction, by which the preload brake 16 and the reel brake 14 are arranged inside and outside of the fast forward gear 1 and the rewinding gear 10, respectively, and regulated by separate control means, since at the play the preload brake 16 is detached and at the tape loading and the fast forward only the preload brake 16 is operated, any infructuous load, which was produced by the prior art techniques, is not applied. Consequently there is no fear that at the play the preload brake 16 is engaged with the gear, even if the thrusting direction in the circumferential direction of the reel brake 14 and the preload brake 16 is inversed.

In addition, in this embodiment, since the first and the second control brake 6 and 19 and the first and the second brake release plate 18 and 20 controlling the preload brake 16 and the reel brake 14, repectively, are superposed on each other, simplification of the construction is achieved.

Other embodiments

This invention is not restricted to the embodiment described above at all, but the shape of the preload brake and that of the reel brake can be conveniently selected and the arragement and the construction of the control means can be arbitrarily modified.

As explained above, according to this invention, it is possible to provide a mode switching over gear mechanism in a digital audio type tape recorder having a rotating head, in which the preload brake is released at the play so that no infructuous load is applied and that it is not needed to increase the driving force of the reel, owing to the construction, by which the preload brake and the reel brake are arranged inside and outside of the fast forward gear and the rewinding gear, respectively, and the control of the preload brake is effected by the same member as that for the control of the take-up gear.

In addition, if the reel driving gear is disposed under the supply reel, high efficiency three-dimensional space utilization is possible.

The embodiments of the invention in which an exclusive property or privilege is claimed are defined as follows:

1. Mode switching over gear mechanism for reel used in adigital audio type tape recorder having a rotating head, comprising;
    a winding reel for winding a tape at the play mode in said tape recorder;
    a supply reel for sending out said tape at said play mode;
    a reel driving gear rotated by a reel motor;
    a center gear disposed between said winding reel and said supply reel and engaged with said reel driving gear;
    a take-up gear disposed between said center gear and said winding reel and engaged with said center gear and said winding reel at said play mode so as to link them;
    a fast forward gear engaged always with said winding reel;
    a rewinding gear engaged always with said supply reel;
    a linking arm for fast forward/rewinding, whose one end is mounted on the shaft of said center gear, having friction with respect to said center gear;
    a linking gear for fast forward/rewinding mounted on the other end of said linking arm, engaged selectively with said fast forward gear or said rewinding gear, depending on the rotational direction of said linking arm;
    two reel brakes disposed at the outside of said fast forward gear and said rewinding gear, respectively, and thrusted thereagainst at said play mode;
    two preload brakes disposed at the inside of said fast foward gear and said rewinding gear, respectively, and thrusted thereagainst at the tape loading mode and at the fast forward/rewinding mode;
    a first control member for controlling thrust and separation of said reel brakes with respect to said fast forward gear and said rewinding gear; and
    a second control member for controlling engagement and disengagement of said take-up gear with respect to said fast forward gear and said rewinding gear and thrust and separation of said preload brakes with respect to said fast forward gear and said rewinding gear.

2. Mode switching over gear mechanism for reel according to claim 1, in which said reel driving gear is disposed coaxially to and independently of said supply reel thereunder.

* * * * *